United States Patent
Moon et al.

(10) Patent No.: US 9,758,051 B2
(45) Date of Patent: Sep. 12, 2017

(54) CIRCUIT FOR PROTECTING BATTERY FOR ELECTRIC VEHICLE AND DRIVING METHOD THEREOF

(71) Applicant: Hyundai Motor Company, Seoul (KR)

(72) Inventors: Hee Sung Moon, Hwaseong-si (KR); Jun Seok Choi, Suwon-si (KR); Woo Jin Shin, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 343 days.

(21) Appl. No.: 14/460,091

(22) Filed: Aug. 14, 2014

(65) Prior Publication Data

US 2015/0188338 A1   Jul. 2, 2015

(30) Foreign Application Priority Data

Dec. 27, 2013 (KR) .......... 10-2013-0165488

(51) Int. Cl.
| | | |
|---|---|---|
| *H02J 7/00* | (2006.01) | |
| *B60L 11/18* | (2006.01) | |
| *B60L 3/00* | (2006.01) | |
| *B60L 3/04* | (2006.01) | |
| *B60L 3/12* | (2006.01) | |

(52) U.S. Cl.
CPC .......... *B60L 11/1861* (2013.01); *B60L 3/0046* (2013.01); *B60L 3/04* (2013.01); *B60L 3/12* (2013.01); *B60L 11/1803* (2013.01); *B60L 2240/547* (2013.01); *Y02T 10/7005* (2013.01);
(Continued)

(58) Field of Classification Search
CPC .......... G01R 31/3658; G01R 19/16542; Y02T 10/7061; Y02T 10/7005; B60L 11/1866; B60L 2240/547; B60L 3/0046; B60L 11/1879; B60L 11/1864; H02J 7/0021; H02J 9/02; H02J 7/0026; H02J 9/065; H02J 7/0022; H02J 7/0068; H02J 7/34;
(Continued)

(56) References Cited

U.S. PATENT DOCUMENTS

| | | | |
|---|---|---|---|
| 2009/0087722 A1* | 4/2009 | Sakabe ................ | B60L 3/0046 429/61 |
| 2011/0248719 A1* | 10/2011 | Aoki ................... | H01M 10/482 324/426 |
| 2012/0025769 A1* | 2/2012 | Kikuchi ............... | B60L 3/0046 320/118 |

FOREIGN PATENT DOCUMENTS

| | | |
|---|---|---|
| JP | 2010-230678 A | 10/2010 |
| JP | 4862745 B2 | 1/2012 |

(Continued)

*Primary Examiner* — Binh Tat
(74) *Attorney, Agent, or Firm* — McDermott Will & Emery LLP

(57) ABSTRACT

A circuit for protecting a battery for an electric vehicle includes a high voltage battery configured to output a DC voltage, an inverter configured to selectively receive the DC voltage from the high voltage battery and invert the DC voltage into an AC voltage when the inverter receives the DC voltage, a relay disposed between the high voltage battery and the inverter and configured to selectively block the DC voltage from the high voltage battery to the inverter, and a battery management system including a microchip configured to output a main relay control signal for controlling the relay. The battery management system is configured to receive the DC voltage from the high voltage battery, and output a voltage relay control signal controlling the relay separately from the control by the microchip.

5 Claims, 4 Drawing Sheets

(52) U.S. Cl.
CPC .......... *Y02T 10/705* (2013.01); *Y02T 10/7044* (2013.01)

(58) Field of Classification Search
CPC .. H02J 7/345; H02J 9/061; H02J 7/025; H02J 7/0016; H05B 33/0803
USPC .................................................. 320/128–136
See application file for complete search history.

(56) References Cited

FOREIGN PATENT DOCUMENTS

| KR | 10-1997-0055025 A | 12/1995 |
| KR | 10-2006-0083684 A | 7/2006 |
| KR | 10-2008-0028160 A | 3/2008 |
| KR | 10-0921647 B1 | 10/2009 |

* cited by examiner

FIG. 3

| Main relay control signal of microchip | Voltage relay control signal of OP AMP comparator | Final relay control signal |
|---|---|---|
| 0 (Relay open) | 0 | 0 |
| 0 | 1 (Relay closed) | 0 |
| 1 | 0 | 0 |
| 1 | 1 | 1 |

CIRCUIT FOR PROTECTING BATTERY FOR ELECTRIC VEHICLE AND DRIVING METHOD THEREOF

CROSS-REFERENCE TO RELATED APPLICATION

This application claims benefit of priority to Korean Patent Application No. 10-2013-0165488 filed in the Korean Intellectual Property Office on Dec. 27, 2013, the entire contents of which are incorporated herein by reference.

TECHNICAL FIELD

The present inventive concept relates to a method of protecting a battery for an electric vehicle, and more particularly, to a circuit and a method of protecting a battery for an electric vehicle, which are capable of controlling a relay with a voltage of a battery by installing an operational amplifier (OP AMP) circuit inside and outside a battery management system (BMS) in order to maintain the control of the relay even when the battery for the electric vehicle has a high voltage due to an operation problem or overcharging.

BACKGROUND

In general, a high voltage battery is used in a hybrid vehicle or an electric vehicle as a part or all of a power source. In order to protect the high voltage battery, a high voltage relay needs to be used.

The high voltage battery is mounted on a vehicle in a form of one pack by serially connecting about 50 to 100 cells according to a necessary capacity of the battery. The high voltage battery pack has excellent energy density and efficiency, but when the high voltage battery pack is overcharged, there is a risk in that the high voltage battery pack is inflated or exposed, so that a battery management system (BMS) controls a high voltage relay.

That is, when the BMS monitors a sum of the voltages of the entire cells or the voltage of the battery pack, and the sum of the voltages of the entire cells or the voltage of the battery pack is equal to or larger than a reference voltage, the BMS compulsorily opens the relay to prevent the battery from being charged any more, or outputs zero as an available voltage so as to prevent another system from being damaged.

However, since the BMS controls the relay only with a control signal through a microchip therein, when the BMS has a problem due to a vehicle accident, or an erroneous operation of a BMS electronic system is performed, the relay is not properly controlled, so that there is still a risk that the battery may catch on fire or explode.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a circuit and a method of protecting a battery for an electric vehicle, which are capable of controlling a relay even with a voltage of a battery by installing an OP AMP inside or outside a BMS, as well as a BMS control signal, in order to maintain the control of the relay even when the battery for the electric vehicle has a high voltage due to an operation problem or overcharging.

One aspect of the present inventive concept relates to a circuit for protecting a battery for an electric vehicle, including a high voltage battery configured to output a DC voltage, an inverter configured to selectively receive the DC voltage from the high voltage battery, and invert the DC voltage into an AC voltage when the inverter receives the DC voltage, a relay disposed between the high voltage battery and the inverter and configured to selectively block the DC voltage from the high voltage battery to the inverter between the high voltage battery and the inverter, and a battery management system including a microchip configured to output a main relay control signal for controlling the relay, and configured to receive the DC voltage from the high voltage battery and output a voltage relay control signal controlling the relay separately from the control by the microchip.

The battery management system may further include an operational amplifier (OP AMP) comparator disposed inside or outside thereof in order to output the voltage relay control signal.

The OP AMP comparator may compare an input voltage of the high voltage battery with a reference voltage of the battery management system, and outputs a voltage relay control signal according to a result of the comparison.

When the input voltage of the high voltage battery is higher than the reference voltage of the battery management system, the OP AMP comparator may output 0 V, and when the input voltage of the high voltage battery is lower than or equal to the reference voltage of the battery management system, the OP AMP comparator may output a predetermined voltage.

The OP AMP comparator may include two or more OP AMPs, including a first OP AMP configured to compare a voltage, and a second OP AMP configured to invert an output voltage of the first OP AMP.

The battery management system may further include an AND gate, and the voltage relay control signal and the main relay control signal may be input to the AND gate, and an output signal of the AND gate may be inputted to the relay.

Another aspect of the present inventive concept encompasses a method of protecting a battery for an electric vehicle, which comprises a high voltage battery, an inverter for inverting a voltage of the high voltage battery, a relay for selectively blocking a voltage from the high voltage battery to the inverter, and a battery management system for controlling the relay, the method including receiving a voltage from the high voltage battery. The received voltage of the battery is compared with a reference voltage. The relay is opened when the battery voltage is higher than the reference voltage.

In the comparing of the received voltage of the battery and the reference voltage, the voltage may be compared through an OP AMP comparator disposed inside or outside the battery management system.

When the received voltage of the high voltage battery is higher than the reference voltage of the battery management system, the OP AMP comparator may output 0 V, and when the received voltage of the high voltage battery is lower than or equal to the reference voltage of the battery management system, the OP AMP comparator may output a predetermined voltage.

Yet another aspect of the present inventive concept relates to a method of protecting a battery for an electric vehicle, which comprises a high voltage battery, an inverter for inverting a voltage of the high voltage battery, a relay for selectively blocking a voltage from the high voltage battery to the inverter, and a battery management system for controlling the relay, the method including receiving a voltage from the high voltage battery. The received battery voltage is compared with a reference voltage through an operational amplifier (OP AMP) comparator connected with the battery management system, and a voltage relay control signal is outputted based on a result of the comparison. A main relay control signal is outputted through a microchip of the battery controller. The relay is controlled based on at least one of the voltage relay control signal and the main relay control signal.

In the controlling of the relay based on at least one of the voltage relay control signal and the main relay control signal, the main relay control signal and the voltage relay control signal may be inputted to an AND gate of the battery management system as an input signal, and an output signal of the AND gate may be inputted to the relay as a control signal.

When the received voltage from the high voltage battery is higher than the reference voltage of the battery management system according to the comparison by the OP AMP comparator, the voltage relay control signal may be 0 V, and when the received voltage from the high voltage battery is lower than or equal to the reference voltage of the battery management system, the voltage relay control signal may be a predetermined voltage.

As described above, according to the present inventive concept, even when a battery for an electric vehicle has a high voltage due to an operation problem or overcharging, it is possible to control the relay with a battery voltage through the OP AMP connected with the BMS, as well as a BMS control signal, so that a relay control signal is dualized, thereby more effectively controlling the relay.

BRIEF DESCRIPTION OF THE DRAWINGS

FIG. 3 is a table illustrating a process of converting a main relay control signal of a microchip and a voltage relay control signal of an OP AMP comparator into a final relay control signal by passing through an AND gate according to an exemplary embodiment of the present inventive concept.

DETAILED DESCRIPTION

Figure 1:
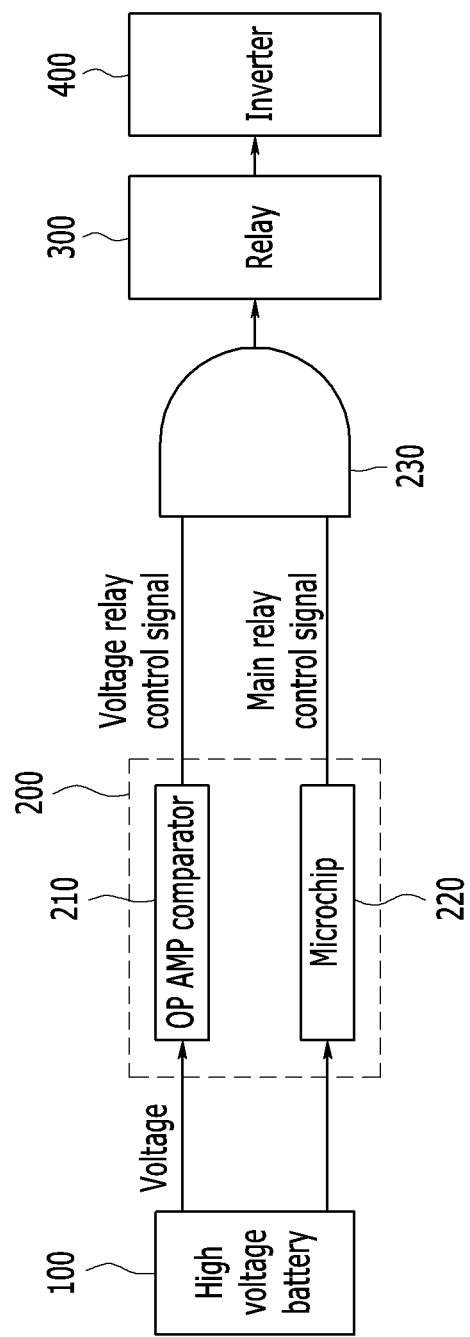
FIG. 1 is a block diagram illustrating a circuit for protecting a battery for an electric vehicle according to an exemplary embodiment of the present inventive concept.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept.

Through the specification, unless explicitly described to the contrary, the word "comprise" and variations such as "comprises" or "comprising", will be understood to imply the inclusion of stated elements but not the exclusion of any other elements.

Like reference numerals designate like constituent elements throughout the specification.

In the present specification and the claims, it shall be appreciated that an electric vehicle is all of the vehicles using electricity as a power source, such as a plug in hybrid electric vehicle (PHEV) or hybrid electric vehicle (HEV) using electricity as a part of a power source, as well as an electric vehicle (EV) using electricity as the entirety of a power source.

Hereinafter, exemplary embodiments of the present inventive concept will be described in detail with reference to the accompanying drawings.

FIG. 1 is a block diagram illustrating a circuit for protecting a battery for an electric vehicle according to an exemplary embodiment of the present inventive concept.

Referring to FIG. 1, the circuit for protecting the battery for an electric vehicle according to an exemplary embodiment of the present inventive concept may include a high voltage battery 100, a battery management system (BMS) 200, a relay 300, and an inverter 400.

The high voltage battery 100 may be a battery such as a nickel metal battery and a lithium ion battery, used in an electric vehicle, and may be mounted inside the electric vehicle to serve to supply power to a driving motor. The high voltage battery 100 may be a pack form of battery cells, which are arranged in series or in parallel, and may be formed of several sub packs. Accordingly, the high voltage battery 100 may be all of the high voltage batteries including a battery pack used in the electric vehicle.

The BMS 200 may manage the high voltage battery 100, and when the high voltage battery 100 is overcharged by controlling the relay 300, the BMS 200 may prevent the power of the high voltage battery 100 from flowing toward the inverter 400.

As illustrated in FIG. 1, the BMS 200 according to an exemplary embodiment of the present inventive concept may include an OP AMP comparator 210 and a microchip 220.

The OP AMP comparator 210 may be formed of an OP AMP circuit, and may compare a voltage received from the high voltage battery 100 with a reference voltage of the BMS 200, and the microchip 220 may perform a unique operation performed by the BMS 200.

The OP AMP comparator 210 may be used while a high voltage and a low voltage may be simultaneously connected, so that insulation may be maintained by installing a photo coupler, and the like.

As illustrated in FIG. 1, the OP AMP comparator 210 may be additionally installed in a circuit inside the BMS 200, and in another exemplary embodiment of the present inventive concept, the OP AMP comparator 210 may also be installed outside the BMS 200 by using a separate circuit. Accordingly, the OP AMP comparator 210 may be all of the circuits which may be installed to be connected with the BMS 200.

Figure 2:
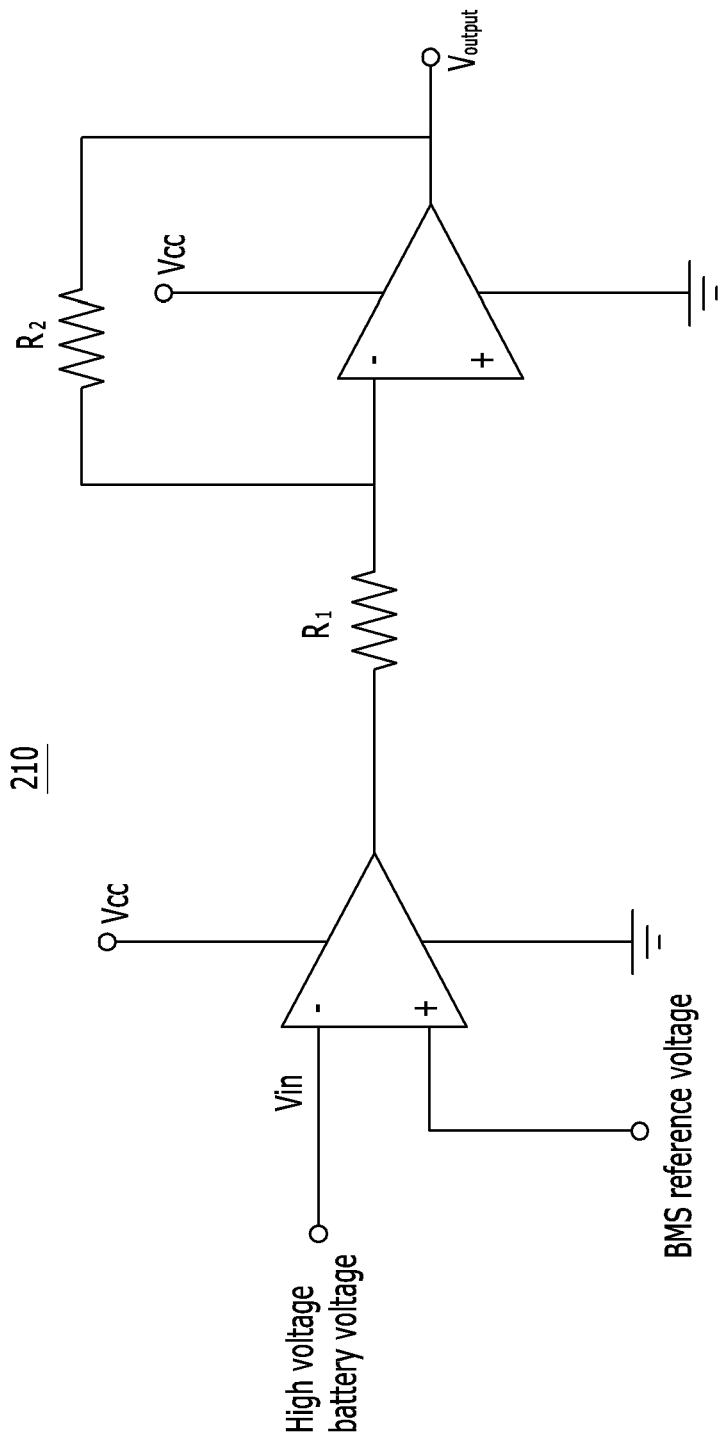
FIG. 2 is a circuit diagram configuring an OP AMP in a circuit for protecting a battery for an electric vehicle according to an exemplary embodiment of the present inventive concept.

FIG. 2 is a circuit diagram configuring the OP AMP comparator 210 in the circuit for protecting the battery for the electric vehicle according to an exemplary embodiment of the present inventive concept.

As illustrated in FIG. 2, the OP AMP comparator 210 may use two or more OP AMP circuits. The circuit for protecting the battery for the electric vehicle according to an exemplary embodiment of the present inventive concept may use two OP AMP circuits.

A first OP AMP circuit among them may compare a voltage, and a second OP AMP circuit may reverse an output voltage in order to output a value of the voltage according to a result of the comparison by the first OP AMP circuit.

The first OP AMP circuit may output zero as an output voltage when the voltage of the high voltage battery 100 exceeds the reference voltage of the BMS 200, and may output a predetermined voltage when the voltage of the high voltage battery 100 is smaller than or equal to the reference voltage of the BMS 200.

Accordingly, the BMS 200 may simultaneously output a voltage relay control signal from the OP AMP comparator 210 and a main relay control signal from the microchip 220. To this end, the BMS 200 may be implemented by one or more processors operated by a set program, and the set program may be programmed so as to perform each step of a method of protecting a battery for an electric vehicle according to an exemplary embodiment of the present inventive concept.

Referring to FIG. 1, the relay 300 may be positioned between the high voltage battery 100 and the inverter 400 to serve to protect the high voltage battery 100.

An AND gate 230 may be installed at a front end of the relay 300, so that the voltage relay control signal and the main relay control signal inputted to the relay 300 pass through the AND gate 230.

FIG. 3 is a table illustrating a process of converting the main relay control signal of the microchip 220 and the voltage relay control signal of the OP AMP comparator 210 into a final relay control signal by passing through the AND gate 230 according to an exemplary embodiment of the present inventive concept.

As illustrated in FIG. 3, the relay 300 may be closed only when both the voltage relay control signal from the OP AMP comparator 210 and the main relay control signal from the microchip 220 maintain the relay 300 to be in a closed state. That is, when the voltage relay control signal and the main relay control signal output a signal (for example, 1) for closing the relay 300, a final relay control signal passing through the AND gate may make the relay 300 be maintained in the closed state.

In the meantime, when any one of the voltage relay control signal or the main relay control signal opens the relay, the high voltage battery 100 may be protected by opening the relay 300. That is, when any one of the voltage relay control signal or the main relay control signal outputs a signal (for example, 00) for opening the relay, the final relay control signal passing through the AND gate may open the relay.

The inverter 400 may serve to convert a DC voltage into a three-phase AC voltage for driving a motor, and may generally include a switching element, a transistor, and a gate driver for supplying a signal to the switching element.

When the relay 300 is opened, the electrical connection between the inverter 400 and the high voltage battery 100 may be cut, so that the high voltage battery 100 is protected.

Hereinafter, a method of protecting a battery for an electric vehicle according to an exemplary embodiment of the present inventive concept will be described with reference to FIG. 4.

Figure 4:
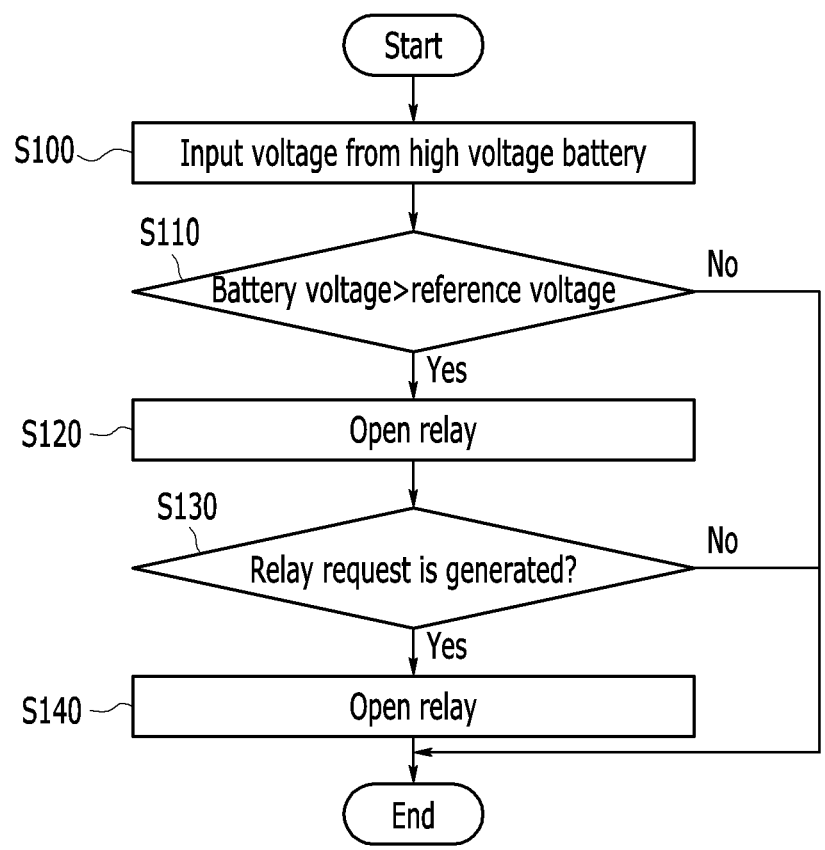
FIG. 4 is a flowchart illustrating a method of protecting a battery for an electric vehicle according to an exemplary embodiment of the present inventive concept.

FIG. 4 is a flowchart illustrating a method of protecting a battery for an electric vehicle according to an exemplary embodiment of the present inventive concept.

As illustrated in FIG. 4, the method of protecting a battery for an electric vehicle according to an exemplary embodiment of the present inventive concept may begin by receiving a voltage from the high voltage battery 100 (S100).

When the BMS 200 receives the voltage from the high voltage battery 100, the OP AMP comparator 210 connected with the BMS 200 may compare the received battery voltage with a reference voltage (S110).

When the received battery voltage exceeds the reference voltage, the BMS 200 may output 0 V, and when the received battery voltage is smaller than or equal to the reference voltage, the BMS 200 may output a predetermined voltage in step S110.

When the received battery voltage exceeds the reference voltage in step S110, the BMS 200 may control the relay to be opened (S120). That is, when the high voltage battery 100 has a high voltage due to an operation problem or overcharging, the BMS 200 may open the relay to protect the high voltage battery 100.

The BMS 200 may determine whether a relay request is generated by the microchip 220 (S130) while simultaneously performing step S110. The step of determining whether the relay request is generated may be operated according to an existing relay control technology.

When it is determined in step S130 that the relay request is generated, the BMS 200 may control the relay to be opened (S140) similar to step S120.

That is, when any one of the case where the received battery voltage exceeds the reference voltage in step S110 and the case where the relay request is generated in step S130 is satisfied, the BMS 200 may control the relay to be opened.

However, when the received battery voltage is smaller than or equal to the reference voltage in step S110 and the relay request is not generated in step S130, the BMS 200 may not separately control the relay and may make the relay be maintained in the closed state.

When the BMS performs the control of the relay in step S140, the method of protecting the battery for the hybrid or electric vehicle according to an exemplary embodiment of the present inventive concept may be terminated. Accordingly, it is possible to protect the high voltage battery 100 from a problematic state, such as the operation problem or the overcharging.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A circuit for protecting a battery for an electric vehicle, comprising:
a high voltage battery configured to output a DC voltage;
an inverter configured to selectively receive the DC voltage from the high voltage battery, and invert the DC voltage into an AC voltage when the inverter receives the DC voltage;
a relay disposed between the high voltage battery and the inverter and configured to selectively block the DC voltage from the high voltage battery to the inverter; and
a battery management system including a microchip configured to output a main relay control signal for controlling the relay, and configured to receive the DC voltage from the high voltage battery and output a voltage relay control signal controlling the relay separately from the control by the microchip,
wherein the battery management system further comprises an operational amplifier (OP AMP) comparator disposed inside or outside thereof in order to output the voltage relay control signal, and
wherein the battery management system controls to close the relay when both the voltage relay control signal from the OP AMP comparator and the main relay control signal from the microchip output a signal for closing the relay.

2. The circuit of claim 1, wherein the OP AMP comparator is configured to compare an input voltage of the high voltage battery with a reference voltage of the battery management system, and output a voltage relay control signal according to a result of the comparison.

3. The circuit of claim 2, wherein the OP AMP comparator is configured to output 0 V when the input voltage of the high voltage battery is higher than the reference voltage of the battery management system, and the OP AMP comparator is configured to output a predetermined voltage when the input voltage of the high voltage battery is lower than or equal to the reference voltage of the battery management system.

4. The circuit of claim 1, wherein the OP AMP comparator comprises two or more OP AMPs, including a first OP AMP configured to compare a voltage, and a second OP AMP configured to invert an output voltage of the first OP AMP.

5. The circuit of claim 1, wherein:
   the battery management system further comprises an AND gate, and
   the voltage relay control signal and the main relay control signal are inputted to the AND gate, and an output signal of the AND gate is inputted to the relay.

* * * * *